J. F. & J. A. CROFT.
VEHICLE JACK.
APPLICATION FILED NOV. 11, 1915.
1,202,970.
Patented Oct. 31, 1916.
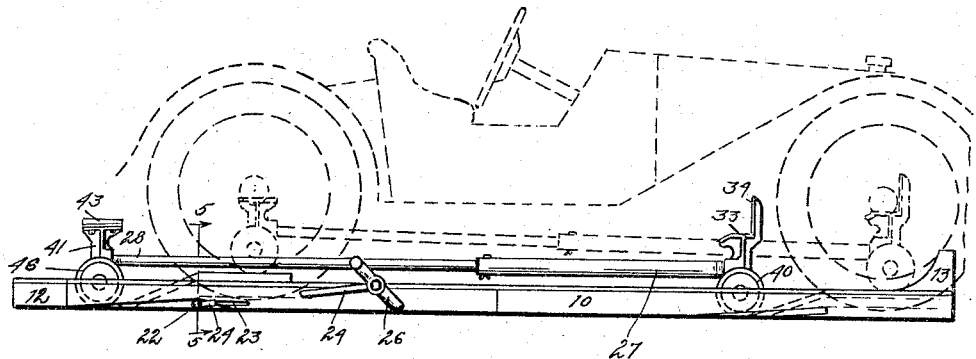
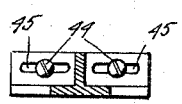
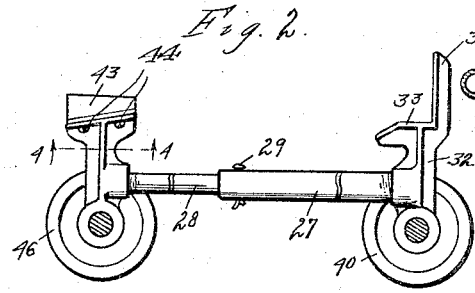
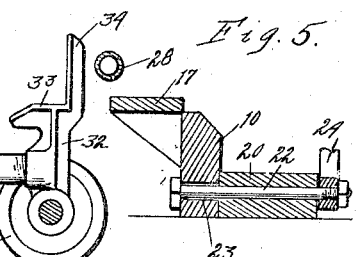
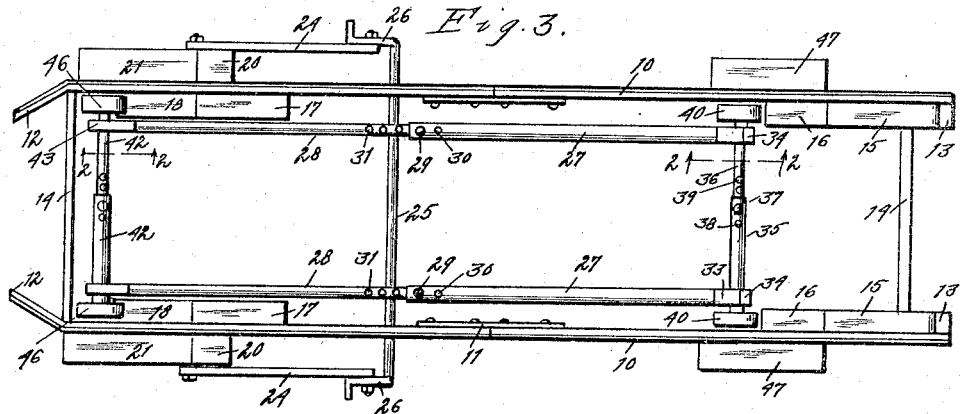
Witnesses
G. F. Turecheh
A. G. Hague
Inventors
John F. Croft
Joseph A. Croft
by Orwig & Bair
Attys.

UNITED STATES PATENT OFFICE.

JOHN F. CROFT AND JOSEPH A. CROFT, OF SLATER, IOWA.

VEHICLE-JACK.

1,202,970.  Specification of Letters Patent.  Patented Oct. 31, 1916.

Application filed November 11, 1915. Serial No. 60,964.

*To all whom it may concern:*

Be it known that we, JOHN F. CROFT and JOSEPH A. CROFT, citizens of the United States, and residents of Slater, in the county of Story and State of Iowa, have invented a certain new and useful Vehicle-Jack, of which the following is a specification.

The object of our invention is to provide a vehicle-jack so constructed that the automobile or other vehicle may be driven thereon and raised for supporting it when not in use, above the floor.

A further object is to provide a device of the kind mentioned whereby the automobile or other vehicle may be raised by simply driving it upon the jack without the use of any screw or other independent raising means.

Still a further object is to provide such a jack from which the automobile or other vehicle may be removed by simply driving it off the jack after a very slight adjustment has been made in the jack parts.

Our invention consists in the construction, combination and arrangement of the various parts of the device, whereby the objects contemplated are attained, as hereinafter more fully set forth, pointed out in our claims and illustrated in the accompanying drawings, in which:

Figure 1 shows a side elevation of a jack embodying our invention, the automobile being shown in dotted lines mounted thereon. Fig. 2 shows a central, vertical, longitudinal sectional view of the jack, parts being removed for reducing the size of the view, taken on the line 2—2 of Fig. 3. Fig. 3 shows a top or plan view of the jack. Fig. 4 shows a horizontal, sectional view, taken on the line 4—4 of Fig. 2 in the direction indicated by the arrows, and Fig. 5 shows a transverse, sectional view, taken on the line 5—5 of Fig. 1.

In the accompanying drawings we have used the reference numeral 10 to indicate generally spaced, longitudinal, two-part frame members. The two parts of each frame member 10 are secured together by suitable means 11. At their rearward ends the frame members 10 are inclined inwardly at 12. On the inside of the forward end of each frame member 10 is a supporting block 15, having the inclined portion 16 at its rearward end. The forward end of each block 15 has the curved, upwardly extending stop member 13. The frame members 10 are connected at their forward and rearward ends by suitable transverse members 14. The portion 16 of each member 15 is extended upwardly from the floor at its rearward end.

Secured to the inner side of each member 10 near its rearward end, is a supporting block 17 having at its rearward end an inclined portion 18 similar to the inclined portion 16 of the block 15. The blocks 17 may be made in the form of flanges 19, as shown in Fig. 5.

On the outer side of the rear end of each member 10 is a supporting block 20, having a rearwardly and downwardly inclined portion 21. The blocks 20 are slidably mounted on the frame members 10 by means of bolts 22 extended through the blocks 20 and mounted in longitudinally elongated slots 23 in the frame members 10. Pivoted to the outer ends of the bolts 22 are links 24 which extend forwardly in the machine.

Mounted in the frame members 10 near the forward ends of the links 24, is a transverse shaft 25 which is mounted for rotation near the lower edges of the members 10. Formed at each end of the shaft 25 is a crank 26. The forward ends of the links 24 are pivoted to the respective cranks 26 at points between their ends, as shown in Fig. 3. It will be seen that by the manipulation of the cranks 26 the blocks 20 may be moved forwardly or rearwardly in the machine.

Received within the frame 10 is a truck device comprising spaced longitudinal frame members 27, on which are telescopically mounted spaced longitudinal frame members 28 which may be locked in various positions with relation to the frame members 27, by means of pins 29 selectively received in holes 30 in the members 27 and holes 31 in the members 28. Mounted on the forward end of each member 27 is a supporting bracket 32 having a flat horizontal surface 33 to receive the axle of a vehicle, and an upwardly extending engaging member 34 at its forward end to engage the axle and to prevent the axle from passing over the part 33.

Mounted in the downward extensions of the brackets 32 are transverse frame members 35 and 36, telescopically mounted on each other and locked in various positions by means of pins 37 mounted in the holes 38 in the members 35 and 36. The outer ends of the members 35 and 36 project beyond the brackets 32 and on said outer ends are mounted similar supporting wheels 40.

On the rear ends of the frame members 28 are mounted brackets 41 having portions which project downwardly from the frame members 28. In the downwardly extending portions of the brackets 41 are mounted frame members 42 which are telescopically mounted upon each other in the same manner as are the members 35 and 36. The upper ends of the brackets 41 have flat surfaces slightly inclined from their forward ends downwardly and rearwardly, and mounted on said inclined surfaces are rubber wedges 43 which may be adjusted to different heights with relation to the floor, by sliding them upon the inclined upper surfaces of the brackets 41 and locking them in various positions by means of screws 44 extended into the blocks 43 slidably mounted in elongated slots 45 in the brackets 41.

In the practical operation of our improved jack, the parts are properly adjusted to fit the automobile to be raised. This is easily done by measuring the wheel base and the height of the rear axle, and adjusting the members 43. The cranks 26 are manipulated to move the members 20 to their forward limit of movement. The front wheels of the automobile are driven over the members 21 and 21 on opposite sides of the frame 10, and the machine is driven farther forwardly until the front axle engages the upright members 34 and the members 43 are below the rear axle. As the automobile travels forwardly the wheels 40 travel upwardly on the inclined portions 16 and the wheels 46 on the members 42 travel forwardly and upwardly on the members 18. The front wheels of the automobile travel upwardly on the inclined members 47, which may be blocks having inclined upper surfaces, the blocks being secured to the outer sides of the forward portions of the frame members 10, and the rear wheels travel upwardly on the members 21. It will be seen that the forward ends of the members 47 terminate at the rearward ends of the blocks 15 at approximately the points where the inclined portions 16 begin. As the automobile travels forwardly the front wheels pass beyond the members 47 and the front part of the automobile is then supported by means of the axle on the brackets 32. When the wheels 40 travel approximately to the stops 13, the wheels 46 rest upon the flat upper surfaces of the members 17. The rear wheels of the automobile then stand almost on the forward edges of the members 20 which are just high enough to receive a comparatively slight part of the weight of the machine. The result is that the members 20 are slid or driven slidably rearwardly to the positions shown in Figs. 1 and 3. The automobile will then be supported in its raised position until it is needed for use. The shaft 25 is strong enough so that the front wheels of the automobile may run over it without bending it. When it is desired to remove the automobile from the jack, the cranks 26 are manipulated to force the members 20 forwardly until they rest below the rear wheels of the automobile which will impose some slight weight upon the members 20. When the machine is started on reverse the rear wheels will frictionally engage the members 20 for drawing the machine on the jack rearwardly until the wheels 40 and 46 travel down the inclines 16 and 18 and the automobile leaves the jack and may be removed.

The advantages of our improved jack may be largely seen from the foregoing description. It may be used without the use of any special tools. The machine may be driven upon it and supported without leaving the driver's seat, and after the cranks 26 have been properly manipulated may be driven off the jack without leaving the driver's seat.

It will be understood that some changes may be made in the construction and arrangement of the parts of our improved jack without departing from its essential features and purposes, and it is our intent to cover by this application any such changes which may be included within the scope of our claims.

We claim as our invention:

1. In a device of the class described, a frame, a pair of inclined members mounted on said frame and adapted to stand in the path of travel of an automobile, a pair of inclined members spaced laterally from said first members, supporting members flush with the highest parts of said last described inclined members, said supporting members having at their forward ends stop devices, said first named inclined members being located with their forward ends substantially in a transverse line with the rearward ends of said supporting members, a pair of inclined members located rearwardly in the machine from said second inclined members, supporting members in front of said third inclined members, inclined members adjacent to said last described inclined members adapted to be in the path of the rear wheels of a motor vehicle, supporting members operatively connected with said last named inclined members slidably mounted on said frame, said last named supporting members being adapted to travel alongside said second described supporting members, an adjustable frame, wheels mounted thereon adapted to travel on said second and third inclined members and said supporting members, and brackets on said adjustable frame for supporting the axles of a motor vehicle, the forward brackets having upwardly extending members for engaging the front axle of the motor vehicle.

2. In a device of the class described, a frame, front supporting members having inclined approaches, a truck having wheels adapted to travel on said inclined approaches and having portions adapted to engage and hold the axles of a vehicle, part of said last described portions being adapted to engage the forward part of the front axle of a vehicle whereby forward movement of the vehicle will move said truck forwardly along said inclined approaches to said supporting members, inclined members adapted to be in the path of the front wheels of a motor vehicle terminating rearwardly of the bodies of said first described supporting members, and inclined members slidably mounted on said frame rearwardly of said last described inclined members, designed to stand in the path of the rear wheels of a motor vehicle and so proportioned that when the rear wheels of the vehicle advance over them said rear wheels will clear said last described inclined members and the rear wheels of said truck stand upon their corresponding supporting members.

3. In a device of the class described, a frame, front supporting members having inclined approaches, a truck having wheels adapted to travel on said inclined approaches and having portions adapted to engage and hold the axles of a vehicle, part of said last described portions being adapted to engage the forward part of the front axle of a vehicle whereby forward movement of the vehicle will move said truck forwardly along said inclined approaches to said supporting members, inclined members adapted to be in the path of the front wheels of a motor vehicle terminating rearwardly of the bodies of said first described supporting members, and inclined members slidably mounted on said frame rearwardly of said last described inclined members, designed to stand in the path of the rear wheels of a motor vehicle and so proportioned that when the rear wheels of the vehicle advance over them said rear wheels will clear said last described inclined members and the rear wheels of said truck stand upon their corresponding supporting members, said last described inclined members having supporting members at their forward ends, and means for sliding said last described supporting members horizontally, whereby they may be moved to position to be engaged by the rear wheels of the vehicle when it is desired to remove the vehicle from the machine.

Des Moines, Iowa, October 23, 1915.

JOHN F. CROFT.
JOSEPH A. CROFT.

Copies of this patent may be obtained for five cents each, by addressing the "Commissioner of Patents, Washington, D. C."